United States Patent [19]

Kochi et al.

[11] Patent Number: 4,857,576

[45] Date of Patent: Aug. 15, 1989

[54] METHOD FOR RENDERING A FLAMMABLE POLYMER MATERIAL FLAME-RESISTANT

[75] Inventors: Hiromi Kochi; Kenji Fukunaga, both of Fukuyama; Takaharu Itagaki, Yokohama; Tsuyoshi Ito, Machida, all of Japan

[73] Assignees: Mitsubishi Kasei Corporation, Tokyo; MANAC Incorporated, Fukuyama, both of Japan

[21] Appl. No.: 843,914

[22] Filed: Mar. 21, 1986

Related U.S. Application Data

[63] Continuation of Ser. No. 646,079, Aug. 31, 1984, abandoned.

[30] Foreign Application Priority Data

Sep. 20, 1983 [JP] Japan .................................. 58-173656

[51] Int. Cl.$^4$ ................................................ C08K 3/22

[52] U.S. Cl. ..................................... 524/409; 525/151; 525/165; 525/184; 525/214; 525/223; 525/235; 525/240; 525/241; 525/327.1; 525/329.5; 525/332.2

[58] Field of Search .................. 525/165, 332.2, 329.5, 525/327.1, 151, 184, 214, 223, 235, 240, 241, 165; 524/409

[56] References Cited

U.S. PATENT DOCUMENTS

3,474,067 10/1969 Praetzel et al. ...................... 525/214
4,246,354 1/1981 Herbin et al. ....................... 525/332.2
4,352,909 10/1982 Barda et al. ......................... 525/157

*Primary Examiner*—Jacob Ziegler
*Attorney, Agent, or Firm*—Oblon, Spivak, McClelland, Maier & Neustadt

[57] ABSTRACT

A method for rendering a flammable polymer material flame-resistant, which comprises incorporating to the flammable polymer material a powder of a cross-linked aromatic polymer brominated to contain from 30 to 70% by weight of bromine.

16 Claims, No Drawings

METHOD FOR RENDERING A FLAMMABLE POLYMER MATERIAL FLAME-RESISTANT

This application is a continuation of application Ser. No. 646,079, filed Aug. 31, 1984, now abandoned.

BACKGROUND OF THE INVENTION

1. Field of the Invention

The present invention relates to a method for imparting flame retardancy to a flammable polymer material such as a plastic or a rubber by incorporating a specific flame retardant therein. More particularly, the present invention relates to such a method wherein a brominated cross-linked aromatic polymer is used as the flame retardant.

2. DESCRIPTION OF THE PRIOR ART

Flammable polymer materials such as plastics or rubbers have various excellent characteristics such as their processability, electric characteristics, mechanical properties and stability. They have been used in a variety of applications in which such excellent characteristics are utilized. There have been remarkable developments in such polymer materials. However, most of the polymer materials have a drawback that they are flammable or combustible.

In their applications particularly for constructional materials and electronic parts, they are, in many cases, subject to various legal restrictions concerning flame retardancy.

As a method for imparting flame retardancy to flammable polymer materials such as plastics or rubbers, it has been known to incorporate to the flammable polymer materials, organic halogen compounds such as hexabromobenzene, decabromobiphenyl ether and tetrabromobisphenol A; organic phosphorus compounds such as dibromopropyl phosphate, tricresyl phosphate and cresyldiphenyl phosphate, and inorganic compounds such as antimony trioxide, alumina and calcium carbonate, alone or in combination. Among them, organic halogen compounds have been widely used in many fields because they are particularly superior in the flame retarding effect, and kinds of flame retardants are increasing year after year.

However, among the most commonly used organic halogen retardants, typical additive-type flame retardants such as decabromobiphenyl ether, hexabromobenzene and tetrabromobisphenol A have not only a problem of the heat stability of the flame retardants themselves when applied to e.g. saturated polyester resins having relatively high molding temperature, but also a serious technical problem which has recently been raised and which is concerned with a blooming phenomenon wherein a part of the flame retardant in the molded resin tends to migrate to the surface of the molded resin, whereby the commercial value of the product will be seriously damaged.

Various technical studies have been made in recent years to solve these problems. Among them, a proposal for increasing the molecular weight of the fire retardant itself has been regarded as of particular interest as a technical theme. For instance, a brominated epoxy oligomer (Japanese Examined Patent Publication No. 39264/1982), a brominated polycarbonate or a brominated polyphenylene has been proposed. Further, U.S Pat. No. 4,352,909 and DE No. 3,061,057 (Japanese Unexamined Patent Publication No. 151007/1980) disclose a process for preparing a brominated polystyrene, wherein a linear polystyrene is brominated under a specific condition. It is disclosed that the brominated polystyrene thereby obtained is incorporated to other plastics as a flame retardant. Furthermore, in U.S. Pat. No. 3,474,067, it is disclosed that a nuclear-brominated polystyrene is obtained by the polymerization of appropriate nuclear-brominated styrene, and it is incorporated to a polyolefin to obtain a flame retarded composition. By using these high molecular weight flame retardants, the blooming may be prevented to some extent. However, as shown by the Comparative Examples given hereinafter, they are not yet fully satisfactory. Also from the viewpoint of the handling of organic halogen flame retardants, high molecular weight flame retardants are considered more advantageous than low molecular weight flame retardants in view of the safety including the working environment. However, the above-mentioned conventional flame retaedants are soluble in organic solvents, and therefore are not adequately satisfactory from the viewpoint of environmental pollution.

There is an increasing demand for flame retardancy of flammable polymer materials and such a trend becomes stronger year after year. The selection of an organic halogen flame retardant has become important for the flame retardancy including heat resistance.

SUMMARY OF THE INVENTION

Under the circumstances, the present inventors have conducted extensive researches and have found that the above-mentioned drawbacks may be substantially reduced by using a brominated cross-linked aromatic copolymer having a three dimensional structure as a flame retardant. The present invention is based on this discovery.

Namely, the present invention provides a method for rendering a flammable polymer material flame-resistant, which comprises incorporating into the flammable polymer material a powder of a cross-linked aromatic polymer brominated to contain from 30 to 70% by weight of bromine.

The flame retardant of the present invention is a cross-linked copolymer and accordingly is not soluble in any solvent. Thus no absorption into a living body takes place. Further, it does not melt by heat and has excellent thermal stability. Furthermore, it is free from blooming since it molecular weight is great. Thus, the brominated cross-linked aromatic polymer of the present invention is a superior flame retardant.

DETAILED DESCRIPTION OF THE INVENTION

Now, the present invention will be described in detail with reference to the preferred embodiments.

In the present invention, a powder of a brominated cross-linked aromatic polymer containing from 30 to 70% by weight of bromine, is used as a flame retardant. Such a brominated cross-linked aromatic polymer is prepared by brominating a cross-linked aromatic copolymer. The cross-linked aromatic copolymer as the starting material may be prepared by the copolymerization of a monovinyl aromatic compound with a polyvinyl compound, or by the cross linking of a linear polyvinyl aromatic compound.

In the case of the preparation of the cross-linked aromatic copolymer by the compolymerization of the monovinyl compound with the polyvinyl compound, a monovinyl aromatic monomer such as styrene, vinyltoluene or vinylnaphthalene is useful as the monovinyl compound. As the polyvinyl monomer, a polyvinyl aromatic monomer such as divinylbenzene, divinylxylene or trivinylbenzene is most useful. However, a polyvinyl heterocyclic compound such as divinyl pyridine or trivinyl pyridine, or a polyvinyl aliphatic monomer such as ethylene glycol dimethacrylate or trimethylol propane trimethacrylate, is also useful. Further, for the purpose of improving the copolymerizability of the monovinyl monomer with the polyvinyl monomer, it is possible to incorporate a polymerizable monomer such as acrylonitrile, methylmethacrylate, octadiene or isoprene as a third component. The ratio of the polyvinyl compound to the monovinyl compound may optionally be varied. However, in order to facilitate the introduction of bromine in an adequate amount and to improve the pulverization property of the resulting polymer, the polyvinyl compound is usually used in an amount of from 2 to 50% by weight, preferably from 3 to 20% by weight, based on the total vinyl compounds. In order to facilitate the pulverization of the resulting copolymer, it is also possible to make the copolymer porous. A method of forming a porous structure is known. For instance, as disclosed in the book "Ion Exchange Resin-Chelate Resin" (compiled by Yoshimasa Hojo and published by Kodansha Scientific Co. in 1976) at page 129 et seq, it is common to employ a method wherein polymerization is conducted in the presence of a component which does not participate in the polymerization and which is incorporated as an additive in the monomer mixture. The amount of such an additive may be optionally varied but is usually from 0 to 200% by weight based on the monomer mixture.

The polymerization may be conducted by subjecting the monomer mixture to a conventional polymerization method. As a simple method, it is advantageous to employ a method of heating under a suspended state or bulk state in the presence of a polymerization initiator. When the polymerization is conducted under a suspended state, the amount of the polymerization initiator is usually within a range of from 0.05 to 5.0% by weight based on the monomer mixture. As the polymerization initiator, there may be used a variety of polymerization initiators. However, in general, a peroxide such as benzoyl peroxide or lauroyl peroxide, or an azo-type polymerization initiator such as azobisisobutyronitrile, is preferably used. When the polymerization is conducted under a suspended state, the monomer mixture is stirred in water as a medium in the presence of a proper dispersant, to carry out the polymerization. The polymerization differs depending upon the type of the polymerization initiator. In the case of benzoyl peroxide, the polymerization is conducted at a temperature of from 60° to 80° C. for from 8 to 20 hours under stirring. After the polymerization, the obtained copolymer is thoroughly washed with water, and in the case where an additive is incorporated, the additive is removed by an operation such as extraction, and then the product is dried.

A method for producing a cross-linked polymer by the cross linking of a linear polyvinyl compound, is also known. For instance, as disclosed in Die Angewandte Makromolekulare chem No. 91, pages 127-142 (1980) V. A. Davankov and M. P. Tsyurupa, it is useful to employ a method wherein a linear polystyrene is cross-linked by Friedel-Crafts reaction. As the linear polyvinyl compound, a polyvinyl aromatic polymer such as polystyrene, polyvinyl toluene or poly-α-methyl styrene, is useful.

The bromination of the gel or porous copolymer thus obtained, is conducted by means of a brominating agent, preferably at a temperature within a range of from 0 to 100° C. As the brominating agent, a bromine-generating agent such as sulfuryl bromide or molecular bromine may be used. In the case where molecular bromine is used, a suitable bromination temperature is from 0° to 50° C., and such a bromination reaction is usually completed in from 2 to 20 hours. The amount of bromine to be introduced varies depending upon the amount of the brominating agent or the reaction condition for the bromination. However, it is preferred to conduct the bromination so that the bromine content in the resulting brominated copolymer is from 30 to 70% by weight. It is preferred to use a catalyst such as ferric chloride or aluminum chloride to perform the bromination reaction smoothly. The amount of such a catalyst is preferably within a range of from 0.025 to 0.2 g relative to 1 g of the copolymer.

Further, it is preferred that prior to the bromination reaction, the copolymer is preliminarily swelled by means of a swelling agent such as dichloroethane or dibromoethane.

After the completion of the bromination reaction, the brominated cross-linked copolymer thus obtained is washed with a sufficient amount of water and then with an organic solvent such as methanol or acetone, and then dried. Then, the polymer is pulverized to a particle size of from 0.1 to 10 μm. For the pulverization, a conventional method may be employed. However, it is preferred to use a pulverizer such as a hammer mill.

The flame retardant of the present invention is usually used in an amount of from 0.1 to 40 parts by weight, preferably from 3 to 30 parts by weight, relative to 100 parts by weight of the flammable polymer material. If the amount is less than 0.1 part by weight, no adequate flame retarding effect is obtainable. On the other hand, if the amount exceeds 40 parts by weight, the properties of the polymer material such as impact resistance or transparency, tend to be impaired.

As the flammable polymer material to be flame-retarded by the present invention, there may be mentioned a variety of flammable high molecular resins such as a polyacetal, a polycarbonate, a polyamide, a polyphenylene oxide, a polysulfone, a polyarylate, a polyphenylene sulfide, a polyethylene terephthalate, a polybutylene terephthalate, a polymethacrylate, a polyethylene, a polypropylene, a polystyrene, an AS resin, an ABS resin and a mixture thereof.

The flame retardant of the present invention may be used alone to impart flame retardancy to the flammable polymer. However, in order to obtain adequate effectiveness with a minimum amount, it is preferred to use it in combination with a flame retardant assistant. As such a flame retardant assistant, it is preferred to employ an antimony compound such as antimony trioxide, antimony pentoxide or antimony tartrate. Particularly preferred is antimony trioxide.

The incorporation of the flame retardant of the present invention to the synthetic resin can be conducted by a conventional mixing method. There may be mentioned a method of mixing and extruding by means of an extruder, a method of simple mixing, followed by direct injection molding, or a method of adding the flame retardant during the preparation of the resin. Further, it may be incorporated together with a reinforcing agent such as a glass fiber, a filler, a heat stabilizer, an antioxidant or a light stabilizer as well as an additive such as a plasticizer, a lubricant or a coloring agent.

Now, the present invention will be described in further detail with reference to Examples. However, it should be understood that the present invention is by no means restricted by these specific Examples. In the Examples, the tensile strength was measured in accordance with ASTM-D-638, and the flame retardancy was measured in accordance with UL 94 test method. Bleeding was visually evaluated after a sample piece was left in an oven at 60° C. for 72 hours and at 130° C. for 72 hours.

Sample No. 1 Bromination of a cross-linked aromatic copolymer

Into a four-necked flask, 100 g of a porous polystyrene cross-linked with 4% by weight of divinylbenzene was introduced, and 500 g of dichloroethane was added. The mixture was left to stand at room temperature for 1 hour, and then 5 g of ferric chloride and 434 g of molecular bromine were added. The mixture was reacted at room temperature for 8 hours. After the completion of the reaction, 3 liters of water was added, and the mixture was heated to 90° C., whereby dichloroethane was azeotropically distilled off. Then, the copolymer was washed with water and further washed with 2 liters of acetone, 3 liters of 1N HCl and 3 liters of desalted water, and then dried at 80° C. for 8 hours. The yield of the brominated copolymer was 272 g, and the bromine content was 63.8% by weight.

Sample No. 2

The same treatment as in the preparation of Sample No. 1 was conducted except that 100 g of a porous polystyrene cross-linked with 10% by weight of divinylbenzene was used as the cross-linked aromatic copolymer, whereby 233.0 g of a brominated copolymer was obtained. The bromine content of this copolymer was 57.2%.

The brominated copolymers i.e. Sample Nos. 1 and 2 were insoluble in most organic solvents.

Sample No. 3 Cross linking and bromination of a linear polymer 200 g of a poly-α-methylstyrene having a molecular weight (weight average) of 10,000 was dissolved in 5 liters of dichloroethane, and the solution was introduced in a 10 liter polymerization reactor equipped with a condenser. Then, 35 g of paraxylene dichloride and 52.2 g of stannic chloride were added, and the mixture was reacted at 80° C. for 16 hours. After the completion of the reaction, the formed bulky cross-linked polymer was collected by filtration, roughly pulverized to a size of from 1 to 2 mm. Then, it was washed successively with 2 liters of diochloroethane, 2 liters of methanol and 2 liters of water, and then dried at 80° C. for 8 hours. The yield of the obtained cross-linked polymer was 207 g. It was insoluble in a solvent such as dichloroethane, toluene, xylene, dimethylformamide or acetonitrile, which is capable of dissolving a poly-α-methylstyrene.

100 g of this cross-linked polymer was treated in the same manner as Sample No. 1, whereby 288 g of a brominated cross-linked polymer was obtained. The bromine content of this polymer was 65.6%.

Sample No. 4 Synthesis of a brominated linear polystyrene 100 g of a polystyrene having a molecular weight of 7,000 was dissolved in 2 liters of dichloroethane, and 5 g of ferric chloride and 434 g of molecular bromine were added. The mixture was reacted at room temperature for 8 hours. After the completion of the reaction, 3 liters of water was added and the mixture was adequately stirred. Then, water was withdrawn, and the dichloroethane solution was added to 20 liters of methanol. The precipitated polymer was collected by filtration, washed with 1 liter of methanol and then dried. The yield of the brominated polystyrene was 250 g. The bromine content was 66.1%. This polymer was soluble in a solvent such as dichloroethane, toluene, xylene or dimethylformamide.

EXAMPLES 1 to 3 and COMPARATIVE EXAMPLES 1 to 5: Evaluation of flame retardancy

The non-brominated cross-linked aromatic copolymer used as the starting material for Sample No. 1, the brominated cross-linked aromatic (co)polymers of Samples Nos. 1 to 3, the brominated polystyrene of Sample No. 4, decabromobiphenyl ether and hexabromobenzene were taken, and respectively pulverized by a sand grinder to an average size of at most 1 μm.

Then, 80 g of each pulverized flame retardant was incorporated to 1 kg of an aromatic polycarbonate resin (Panlite K1300, manufactured by Taijin Limited), and the mixture was kneaded by a laboratory Brabender at 270° C. The blend was molded at 280° C. by a compression molding machine, and then the flame retardancy was evaluated in accordance with UL-94 test method. The evaluation was made on the basis of four grades of HB, V-2, V-1 and V-0. The results are shown in Table 1.

TABLE 1

Evaluation of the flame retardancy and blooming

| | Flame retardant | UL-94 | Blooming 60 C. for 72 hrs. | Blooming 130 C. for 72 hrs. |
|---|---|---|---|---|
| Comparative Example 1 | None | HB | No | No |
| Comparative Example 2 | Non-brominated copolymer for Sample No. 1 | HB | No | No |
| Example 1 | Brominated copolymer of Sample No. 1 | V-0 | No | No |
| Example 2 | Brominated copolymer of Sample No. 2 | V-0 | No | No |
| Example 3 | Brominated copolymer of Sample No. 3 | V-0 | No | No |
| Comparative Example 3 | Brominated polystyrene of Sample No. 4 | V-0 | No | Slightly yes |
| Comparative Example 4 | Decabromobiphenyl ether | V-0 | Yes | Yes |
| Comparative Example 5 | Hexabromobenzene | V-0 | Yes | Yes |

EXAMPLE 4 and COMPARATIVE EXAMPLE 6: Flame retardation of a polybutylene terephthalate A bromide (a bromine content of 63.5%) of a porous cross-linked polystyrene (a divinylbenzene content of 10% by weight) prepared in the same manner as in the preparation of Sample No. 1, a polybutylene terephthalate having an intrinsic viscosity of 0.85 (NOVADUR 5008 manufactured by Mitsubishi Chemical Industries, Ltd.), antimny trioxide (manufactured by Mikuni Seiren K.K.), glass fiber (CS03 MA486A, manufactured by Asahi Fiber Glass Co., Ltd.) and asbestos (R-244, manufactured by Tomoe Kogyo K.K.) were mixed. By means of an extruder equipped with a 40 mm $\phi$ vent, the mixture was melt-kneaded and extruded at 250° C. to obtain pellets. The pellets were subjected to injection molding by means of a 3.9 ounce injection molding machine (N-100B 25 Model, manufactured by The Japan Steel Works, Ltd.), a test piece molding die prescribed in ASTM and a UL combustion test piece molding die prescribed in UL-94, respectively, at a resin temperature of 260° C., At a die temperature of 80° C. for an injection time of 10 seconds, a cooling time of 20 seconds (10 seconds in the case of the UL combustion test piece) and a retention time of 5 minutes, to obtain test pieces. The test pieces thus prepared, were subjected to flame retardancy tests in accordance with UL-94 test method. The results thereby obtained are shown in Table 2.

As Comparative Example 6, the test results of a case wherein a non-cross-linked brominated polystyrene (Pyrochek 68 PB, manufactured by Nissan Ferro Organic Co., Ltd. and having a bromine content of from 65 to 67% by weight) was employed, are also shown in Table 2.

TABLE 2

| Flame retardation of a polybutylene terephthalate | | |
|---|---|---|
| | Example 4 | Comparative Example 6 |
| Composition | | |
| NOVADUR 5008 | 69.8% by weight | 69.8% by weight |
| Flame retardant | Brominated cross-linked polystyrene 10.0% (Br content: 6.4%) | Brominated polystyrene (Pyrochek 68PB) 10.0% (Br content: 6.7%) |
| $Sb_2O_3$ | 5.2% | 5.2% |
| GF | 12.5% | 12.5% |
| Asbestos RG 244 | 2.5% | 2.5% |
| Flame retardancy | | |
| UL 94 | | |
| UB test | | |
| 1/8" | V-0 | V-0 |
| 1/16" | V-0 | V-1 |
| 1/32" | V-0 | HB |

EXAMPLE 5 and COMPARATIVE EXAMPLE 7: Flame retardation of a polyester

Pellets were prepared in the same manner as in Example 4 except that a halogen-containing polyester resin (NOVADUR 5208 manufactured by Mitsubishi Chemical Industries, Ltd. and having a bromine content of 6%) prepared by the copolymerization of 1.0 mol of dimethyl terephthalate, 1.2 mol of 1,4-BG and 0.06 mol of 2,2-bis(4-hydroxyethoxy-3,5-dibromophenyl)propane and having an intrinsic viscosity of 0.85, was used as the base resin. The blending ratios and the results of the flame retardancy tests conducted in the same manner as in Example 4, are shown in Table 3.

Further, a test was conducted in the same manner as in Example 5 except that a non-cross-linked brominated polystyrene was used as the flame retardant instead of the brominated cross-linked polystyrene used in Example 5. The results are shown as Comparative Example 7 in Table 3.

TABLE 3

| Flame retardation of a polyester | | |
|---|---|---|
| | Example 5 | Comparative Example 6 |
| Composition | | |
| NOVADUR 5008 | 76.9% by weight (Br content: 4.6%) | 76.9% by weight (Br content: 4.6%) |
| Flame retardant | Brominated cross-linked polystyrene 2.9% (Br content: 1.9%) | Brominated polystyrene (Pyrochek 68PB) 2.9% (Br content: 2.0%) |
| $Sb_2O_3$ | 5.2% | 5.2% |
| GF | 12.5% | 12.5% |
| Asbestos RG 244 | 2.5% | 2.5% |
| Flame retardancy | | |
| UL 94 | | |
| UB test | | |
| 1/8" | V-0 | V-0 |
| 1/16" | V-0 | V-2 |
| 1/32" | V-2 | HB |

EXAMPLE 6 and COMPARATIVE EXAMPLES 8 to 9: Flame retardation of Nylon 66

The bromide (a bromine content of 63.5%) of the porous cross-linked polystyrene employed in Example 4, Nylon 66 having an intrinsic viscosity of 302, NOVAMID 3010J, manufactured by Mitsubishi Chemical Industries, Ltd.) and antimony trioxide were mixed. By means of a double-screw extruder, the mixture thereby obtained was melt-keaded and extruded at 285° C., to obtain pellets. Test pieces were prepared in the same manner as in Example 4 except that the pellets were injection molded by means of a 3.9 ounce injection molding machine at a resin temperature of 280° C. (injection time: 10 seconds, cooling time: 20 seconds), and the test pieces were subjected to flame retardancy tests.

Further, for the purpose of comparison, similar tests were conducted with respect to the cases wherein a noncross-linked brominated polystyrene (Pyrochek 68 PB) and decabromodiphenyl ether were employed. The results are shown in Table 4.

TABLE 4

| Flame retardation of Nylon 66 | | | |
|---|---|---|---|
| | Example 6 | Comparative Example 8 | Comparative Example 9 |
| Composition | | | |
| NoVAMID 3010J | 72% | 72% | 72% |
| Flame retardant | Brominated cross-linked polystyrene 20.0% (Br content: 12.7%) | Brominated polystyrene 20.0% (Br content: 13.4%) | Decabromo-diphenyl ether 15.3% (Br content: 12.7%) |
| Antimony trioxide | 8.0% | 8.0% | 8.0% |
| Flame retardancy | | | |
| UL 94 | | | |
| Thickness 1/8" | V-0 | V-1 | Defoaming and hardly molded |
| Thickness 1/16" | V-0 | V-2 | " |
| Thickness 1/32" | V-1 | HB | " |

EXAMPLE 7 and COMPARATIVE EXAMPLES 10 to 11: Flame retardation of AAS

A bromide (a bromine content of 65.3%) of a porous cross-linked polystyrene used in Example 4, a polycarbonate (NOVALEX 7022A, manufactured by Mitsubishi Chemical Industries, Ltd.) acrylonitrile-styreneacryl rubber (AAS, Vitax 6100A, manufactured by Hitachi Chemical Industries Co., Ltd.) and antimony trioxide, were mixed. Pellets were prepared in the same manner as in Example 6 by melt-kneading the mixture at 270° C. The pellets were subjected to injection molding under the same condition as in Example 6 to obtain test pieces. The test pieces were subjected to flame retardancy tests.

For the purpose of comparison, similar tests were conducted with respect to the cases wherein a non-crosslinked brominated polystyrene (Pyrochek 68PB) and decabromodiphenyl ether were employed, respectively. The results are shown in Table 5.

TABLE 5

| | Flame retardation of ABS | | |
|---|---|---|---|
| | Example 7 | Comparative Example 10 | Comparative Example 11 |
| Composition | | | |
| NOVALEX 7022A | 42.3% | 42.5% | 43.4% |
| ASS | 42.3% | 42.5% | 43.4% |
| Flame retardant | Brominated cross-linked polystyrene | Brominated polystyrene | Decabromodiphenyl ether |
| | 9.4% | 9.0% | 7.2% |
| | (Br content: 6.0%) | (Br content: 6.0%) | (Br content: 6.0%) |
| Antimony trioxide | 6.0% | 6.0% | 6.0% |
| Flame retardancy | | | |
| UL 94 | | | |
| Thickness ⅛" | V-0 | V-1 | V-0 |
| Thickness 1/16" | V-0 | V-2 | V-2 |
| Thickness 1/32" | V-2 | HB | HB |

What is claimed is:

1. A method for rendering a flammable polymer material flame-resistant, which comprises incorporating into the flammable polymer material a powdered, cross-linked vinyl aromatic polymer brominated to contain from 30 to 70% by weight of bromine and optionally a flame retardant assistant, said brominated cross-linked polymer being substantially non-meltable by heat, wherein said brominated cross-linked vinyl aromatic polymer is prepared by (1) brominating a cross-linked vinyl aromatic copolymer obtained by the copolymerization of a monovinyl aromatic compound with a polyvinyl compound, or (2) brominating a cross-linked vinyl aromatic polymer obtained by cross-linking a vinyl aromatic polymer.

2. The method according to claim 1, wherein said brominated cross-linked vinyl aromatic polymer is prepared by brominating a cross-linked vinyl aromatic copolymer obtained by the copolymerization of a monovinyl aromatic compound with a polyvinyl compound.

3. The method according to claim 2, wherein the content of the polyvinyl compound in said cross-linked vinyl aromatic copolymer is from 3 to 50% by weight.

4. The method according to claim 2, wherein said monovinyl aromatic compound is at least one member selected from the group consisting of styrene, vinyltoluene, vinylnaphthalene and a mixture thereof, and said polyvinyl compound is at least one member selected from the group consisting of a polyvinyl aromatic monomer, a polyvinyl heterocyclic compound, a polyvinyl aliphatic monomer and a mixture thereof.

5. The method according to claim 2, wherein said monovinyl aromatic compound is styrene, and said polyvinyl compound is divinylbenzene.

6. The method according to claim 1, wherein said brominated cross-linked vinyl aromatic polymer is prepared by brominating a cross-linked vinyl aromatic polymer obtained by cross-linking a vinyl aromatic polymer.

7. The method according to claim 6, wherein the cross-linked vinyl aromatic polymer is obtained by cross-linking the vinyl aromatic polymer by a Friedel-Crafts reaction.

8. The method according to claim 1, wherein said flammable polymer material is at least one resin selected from the group consisting of a polyacetal, a polycarbonate, a polyamide, a polyphenyleneoxide, a polysulfone, a polyarylate, a polyphenylene sulfide, a polyethyleneterephthalate, a polybutyleneterephthalate, a polymethacrylate, a polyethylene, a polypropylene, a polystyrene, an acrylonitrile-styrene resin, an acrylonitrile-butadiene-styrene resin and a mixture thereof.

9. The method according to claim 1, wherein said flame-resistant polymer material is prepared by incorporating from 0.1 to 40 parts by weight of said powdered, brominated, cross-linked vinyl aromatic polymer into 100 parts by weight of said flammable polymer material.

10. The method according to claim 9, wherein the quantity of said powdered, brominated, cross-linked vinyl aromatic polymer ranges from 3 to 30 parts by weight per 100 parts by weight of said flammable polymer material.

11. The method according to claim 1, wherein said powdered, brominated, cross-linked vinyl aromatic polymer is incorporated into said flammable polymer material together with a flame retardant assistant which assists the flame retarding action of said brominated, cross-linked vinyl aromatic polymer.

12. A method for rendering a flammable polymer material flame-resistant, which comprises:
incorporating into the flammable polymer material a powdered, brominated cross-linked styrene polymer containing from 30 to 70% by weight bromine and optionally a flame retardant assistant, said brominated cross-linked polymer being substantially non-meltable by heat, said brominated cross-linked styrene polymer being prepared by brominating a cross-linked styrene polymer containing from 3 to 50% by weight divinylbenzene monomer obtained by copolymerizing styrene with divinylbenzene.

13. The method of claim 4, wherein said polyvinyl aromatic monomer is divinylbenzene, divinylxylene or trivinylbenzene, said polyvinyl heterocyclic compound is divinylpyridine or trivinylpyridine and said polyvinyl aliphatic monomer is ethylene glycol dimethacrylate or trimethylolpropane trimethacrylate.

14. A method for rendering a flammable polymer material flame-resistant, which comprises incorporating into the flammable polymer material a powdered, cross-linked vinyl aomatic polymer brominated to contain from 30 to 70% by weight of bromine and optionally a flame retardant assistant, said brominated cross-linked polymer being substantially non-meltable by heat, wherein said brominated cross-linked vinyl aromatic polymer is prepared by (1) brominating a cross-linked vinyl aromatic copolymer obtained by the copolymerization of a monovinyl aromatic compound with a polyvinyl compound, or (2) brominating a cross-linked vinyl aromatic polymer obtained by cross-linking a vinyl aromatic polymer, and the resulting flame-resistant material has a flame retardancy of V-0 as measured by using a 1/16" test piece in accordance with UL-94 standards.

15. A method for rendering a flammable polymer material flame-resistant, which comprises:

incorporating into the flammable polymer material a powdered, brominated cross-linked styrene polymer containing from 30 to 70% by weight bromine and optionally a flame retardant assistant, said brominated cross-linked polymer being substantially non-meltable by heat, said brominated cross-linked styrene polymer being prepared by brominating a cross-linked styrene polymer containing from 3 to 50% by weight divinylbenzene monomer obtained by copolymerizing styrene with divinylbenzene, and the resulting flame-resistant material has a flame retardancy of V-0 as measured by using a 1/16" test piece in accordance with UL-94 standards.

16. The method according to claim 11, wherein the flame retardant assistant is antimony trioxide.

* * * * *